(12) United States Patent
Kitayama et al.

(10) Patent No.: US 10,151,357 B2
(45) Date of Patent: Dec. 11, 2018

(54) ROTATION TRANSMISSION DEVICE (71) Applicant: NTN CORPORATION, Osaka (JP)

(72) Inventors: Naotsugu Kitayama, Shizuoka (JP); Marina Fukunari, Shizuoka (JP); Kyohei Sasanuma, Shizuoka (JP); Koji Akiyoshi, Shizuoka (JP); Masahiro Kawai, Shizuoka (JP); Takahide Saito, Shizuoka (JP); Koji Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 475 days.

(21) Appl. No.: 14/763,527

(22) PCT Filed: Jan. 16, 2014

(86) PCT No.: PCT/JP2014/050644
§ 371 (c)(1),
(2) Date: Jul. 27, 2015

(87) PCT Pub. No.: WO2014/119369
PCT Pub. Date: Aug. 7, 2014

(65) Prior Publication Data
US 2016/0010702 A1 Jan. 14, 2016

(30) Foreign Application Priority Data

Jan. 30, 2013 (JP) .................................. 2013-015460

(51) Int. Cl.
*F16D 27/112* (2006.01)
*F16D 27/14* (2006.01)
(Continued)

(52) U.S. Cl.
CPC ............. *F16D 27/14* (2013.01); *F16D 27/08* (2013.01); *F16D 27/10* (2013.01); *F16D 27/102* (2013.01);
(Continued)

(58) Field of Classification Search
None
See application file for complete search history.

(56) References Cited

U.S. PATENT DOCUMENTS 3,123,169 A * 3/1964 Young ................ B60K 17/3515
180/244
3,897,095 A 7/1975 Glance et al.
(Continued)

FOREIGN PATENT DOCUMENTS

CN 1392847 1/2003
CN 2584928 11/2003
(Continued)

OTHER PUBLICATIONS

Office Action dated Jul. 5, 2017 in corresponding Chinese Application No. 201480004076.X, with English translation.
(Continued)

*Primary Examiner* — Robert W Hodge
*Assistant Examiner* — Ryan P Dodd
(74) *Attorney, Agent, or Firm* — Wenderoth, Lind & Ponack, L.L.P.

(57) ABSTRACT

A rotation transmission device is configured such that when an electromagnet of an electromagnetic clutch is energized, an armature is attracted toward a rotor, so that a control retainer defining a two-way clutch is moved in an axial direction, whereby the control retainer and a rotary retainer are rotated relative to each other in a direction in which circumferential widths of pockets decrease, thereby disengaging pairs of rollers from an inner periphery of an outer ring and an outer periphery of an inner ring. The rotation transmission device includes a shock absorbing member on a surface of the armature facing the rotor, the shock absorb-
(Continued)

ing member being configured to absorb impact force when the armature is attracted to the rotor by being elastically deformed.

6 Claims, 8 Drawing Sheets (51) Int. Cl.
*F16D 41/08* (2006.01)
*F16D 27/08* (2006.01)
*F16D 27/10* (2006.01)
*F16D 27/108* (2006.01)
*F16D 27/102* (2006.01)
*F16D 41/10* (2006.01)
*F16D 41/07* (2006.01)
*F16D 23/12* (2006.01)

(52) U.S. Cl.
CPC ......... *F16D 27/108* (2013.01); *F16D 41/084* (2013.01); *F16D 41/088* (2013.01); *F16D 27/112* (2013.01); *F16D 41/07* (2013.01); *F16D 41/105* (2013.01); *F16D 2023/123* (2013.01); *F16D 2300/22* (2013.01)

(56) References Cited

U.S. PATENT DOCUMENTS

| | | | |
|---|---|---|---|
| 4,896,757 A | 1/1990 | Seager, Sr. | |
| 5,601,168 A | 2/1997 | Hayashi et al. | |
| 7,654,375 B2 * | 2/2010 | Okada | F16D 27/112 192/103 R |
| 9,103,384 B2 * | 8/2015 | Akiyoshi | F16D 41/105 |
| 2002/0005644 A1 | 1/2002 | Tamada et al. | |
| 2006/0180424 A1 | 8/2006 | Sato et al. | |
| 2008/0079205 A1 | 4/2008 | Hayashi et al. | |
| 2011/0036678 A1 | 2/2011 | Hashizume et al. | |
| 2011/0061983 A1 * | 3/2011 | Sato | F16D 27/10 192/38 |
| 2011/0193278 A1 | 8/2011 | Kobori | |
| 2013/0299298 A1 | 11/2013 | Akiyoshi et al. | |
| 2017/0198760 A1 * | 7/2017 | Saito | F16D 27/112 |

FOREIGN PATENT DOCUMENTS

| | | | |
|---|---|---|---|
| CN | 2883778 | | 3/2007 |
| CN | 101784809 | | 7/2010 |
| CN | 102177362 | | 9/2011 |
| CN | 202149171 | | 2/2012 |
| EP | 0 614 022 | | 9/1994 |
| JP | 62-017431 | | 1/1987 |
| JP | 6217431 | * | 1/1987 |
| JP | 5042773 | * | 6/1993 |
| JP | 10-184729 | | 7/1998 |
| JP | 2006-220260 | | 8/2006 |
| JP | 2008-202687 | | 9/2008 |
| JP | 2009-293654 | | 12/2009 |
| JP | 2009-299829 | | 12/2009 |
| JP | WO2012099244 | * | 7/2012 |
| JP | 2012-149746 | | 8/2012 |

OTHER PUBLICATIONS

Chinese Office Action Dated Dec. 14, 2016 in corresponding Chinese Application No. 201480004076.X, with partial English translation.
Extended European Search Report dated Apr. 24, 2017 in corresponding European Application No. 14745370.8.
International Search Report dated Mar. 11, 2014 in International (PCT) Application No. PCT/JP2014/050644.
Written Opinion of the International Searching Authority dated Mar. 11, 2014 in International (PCT) Application No. PCT/JP2014/050644 (with English translation).

* cited by examiner

ROTATION TRANSMISSION DEVICE

TECHNICAL FIELD

The present invention relates to a rotation transmission device used to selectively transmit rotation.

BACKGROUND ART

One known rotation transmission devices used to selectively transmit rotation from a driving shaft to a driven shaft includes a two-way clutch, and an electromagnetic clutch configured to selectively engage and disengage the two-way clutch.

For example, in JP Patent Publication 2012-149746 A, a rotation transmission device is disclosed which includes a two-way clutch, and an electromagnetic clutch configured to selectively engage and disengage the two-way clutch. The two-way clutch includes an outer ring, an inner ring mounted inside the outer ring, and a control retainer and a rotary retainer mounted between the outer ring and the inner ring, with the bars of one retainer arranged circumferentially alternating with the bars of the other retainer. The two-way clutch further includes opposed pairs of rollers, each pair being received in a pocket defined between each adjacent pair of bars, and elastic members each disposed between each opposed pair of the rollers to bias the opposed pair of rollers away from each other into stand-by positions where the respective rollers can instantly engage a cylindrical surface formed on the inner periphery of the outer ring and cam surfaces formed on the outer periphery of the inner ring, whereby when the inner ring rotates in one direction, one of each opposed pair of rollers engages the cylindrical surface and the cam surface, thus transmitting the rotation of the inner ring to the outer ring.

The electromagnetic clutch, which is used to control the two-way clutch, is configured such that when the electromagnet is energized, the control retainer is moved in the axial direction, and simultaneously, the control retainer and the rotary retainer are rotated in the direction in which the circumferential widths of the pockets decreases by the action of a torque cam, as a motion converter mechanism, provided between the opposed surfaces of the flanges of the control retainer and the rotary retainer, thereby moving the pairs of rollers through the bars of the respective retainers to the disengaged positions and preventing transmission of rotation from the inner ring to the outer ring.

In this rotation transmission device, when the electromagnet of the electromagnetic clutch is de-energized, the control retainer and the rotary retainer are rotated relative to each other in the direction in which the circumferential widths of the pockets increase under the biasing force of elastic members disposed between the respective opposed pairs of rollers, so that the opposed pairs of rollers instantly engage the cylindrical surface and the cam surfaces. This rotation transmission device is therefore extremely small in play in the rotational direction and thus fast in response.

OBJECT OF THE INVENTION

In the conventional rotation transmission device disclosed in JP Patent Publication 2012-149746 A, the electromagnetic clutch includes an armature coupled to the control retainer, a rotor axially spaced apart from and axially opposed to the armature, and the electromagnet, which is supported by a stationary member and axially faces the rotor, such that when the electromagnet is energized, the electromagnet applies a magnetic attraction force to the armature such that the armature is attracted to the rotor, thereby moving the control retainer in the axial direction together with the armature. This rotation transmission device has a problem in that when the armature is attracted to the rotor, the armature tends to collide harshly against the rotor, thus generating colliding sounds and vibrations, which could make people uncomfortable or scare people.

SUMMARY OF THE INVENTION

An object of the present invention is to provide a rotation transmission device which generates less colliding sounds and vibrations.

Means for Achieving the Object

In order to achieve the object, the present invention provides a rotation transmission device comprising an input shaft, an output shaft arranged coaxial with the input shaft, a two-way clutch configured to selectively transmit rotation between the input shaft and the output shaft, and an electromagnetic clutch configured to selectively engage and disengage the two-way clutch, wherein the two-way clutch comprises an outer ring provided at an end of the output shaft and having an inner periphery, an inner ring provided at an end of the input shaft and having an outer periphery, a control retainer including first bars, a rotary retainer including second bars, wherein the first bars and the second bars are received between the inner periphery of the outer ring and the outer periphery of the inner ring, and arranged such that the first bars alternate with the second bars in a circumferential direction, with pockets defined between respective adjacent pairs of first and second bars, a plurality of pairs of engaging elements, each pair of the engaging elements being received in each of the pockets so as to be engageable with the inner periphery of the outer ring and the outer periphery of the inner ring, and elastic members each received in each of the pockets and biasing the pair of the engaging elements received in each of the pockets away from each other, wherein the electromagnetic clutch comprises an armature coupled to the control retainer, a rotor spaced apart from, and facing, the armature in an axial direction, and an electromagnet supported by a stationary member so as to face the rotor in the axial direction, and configured to apply a magnetic attraction force to the armature such that the armature is attracted toward the rotor, when the electromagnet is energized, wherein the rotation transmission device is configured such that when the electromagnet is energized, the control retainer is moved in the axial direction toward the rotor, together with the armature, and wherein the rotation transmission device further comprises a motion converter mechanism configured to convert the axial movement of the control retainer toward the rotor to a relative rotation between the control retainer and the rotary retainer in a direction in which circumferential widths of the pockets decrease, thereby disengaging the engaging elements, wherein a shock absorbing member for absorbing the impact force when the armature is attracted to the rotor is provided on one of the opposed surface of the armature facing the rotor and the opposed surface of the rotor facing the armature.

With this arrangement, when the electromagnet is energized, a magnetic attraction force is applied to the armature, and moves the armature toward the rotor until the armature is attracted to the rotor. The shock absorbing member absorbs the impact force when the armature is attracted to the rotor, thus reducing colliding sounds and vibrations.

In the rotation transmission device according to the present invention, the shock absorbing member may comprise an elastic ring made of rubber or synthetic resin. Such an elastic ring is fitted in and inseparably fixed to an annular groove formed in said one of opposed surfaces of the armature and the rotor so as to partially protrude outwardly.

Alternatively, the shock absorbing member may comprise a metal ring comprising an annular plate portion and a cylindrical portion provided at an outer periphery of the annular plate portion, and an elastic protrusion adhesively bonded to the inner surface of the annular plate portion of the metal ring.

This shock absorbing member is mounted such that the cylindrical portion is fitted on the outer periphery of one of the armature and the rotor having said one of the opposed surfaces, the annular plate portion faces an axial end surface of an annular recess formed in said one of the opposed surfaces at the outer peripheral portion of said one of the opposed surfaces, the protrusion is supported by the axial end surface, and the annular plate portion has an outer surface protruding from said one of the opposed surfaces.

Preferably, in order to mount this shock absorbing member in the above-described manner, a plurality of circumferentially spaced apart projections are formed on the radially inner surface of the cylindrical portion, and fitted in an annular groove formed in the outer periphery of said one of the armature and the rotor, so as to be brought into engagement with the end wall of the annular groove on the side of said one of the opposed surfaces. With this arrangement, the shock absorbing member can be stably and inseparably mounted in position.

The protrusion may be a circumferentially continuous annular protrusion, or may comprise a plurality of circumferentially spaced apart, circular arc-shaped, annularly arranged protruding portions.

Further alternatively, the shock absorbing member may comprise an annular plate portion in the form of a metal sheet, and a plurality of elastic bent pieces formed on at least one of the outer peripheral portion and the inner peripheral portion of the annular plate portion so as to be spaced apart from each other in the circumferential direction.

This shock absorbing member is mounted in position by fitting the annular plate portion of the shock absorbing member in an annular groove formed in said one of the opposed surfaces so as to be inseparably fixed in position, with distal ends of the bent pieces protruding outwardly from said one of the opposed surfaces. In the same manner as with the above-described elastic ring, the annular plate portion may be inseparably fixed in position by caulking or by adhesive bonding.

ADVANTAGES OF THE INVENTION

According to the present invention, the shock absorbing member provided on one of the opposed surfaces of the armature and the rotor absorbs the impact force when the armature is attracted to the rotor, thus reducing colliding sounds and vibrations.

BEST MODE FOR EMBODYING THE INVENTION

Figure 1:
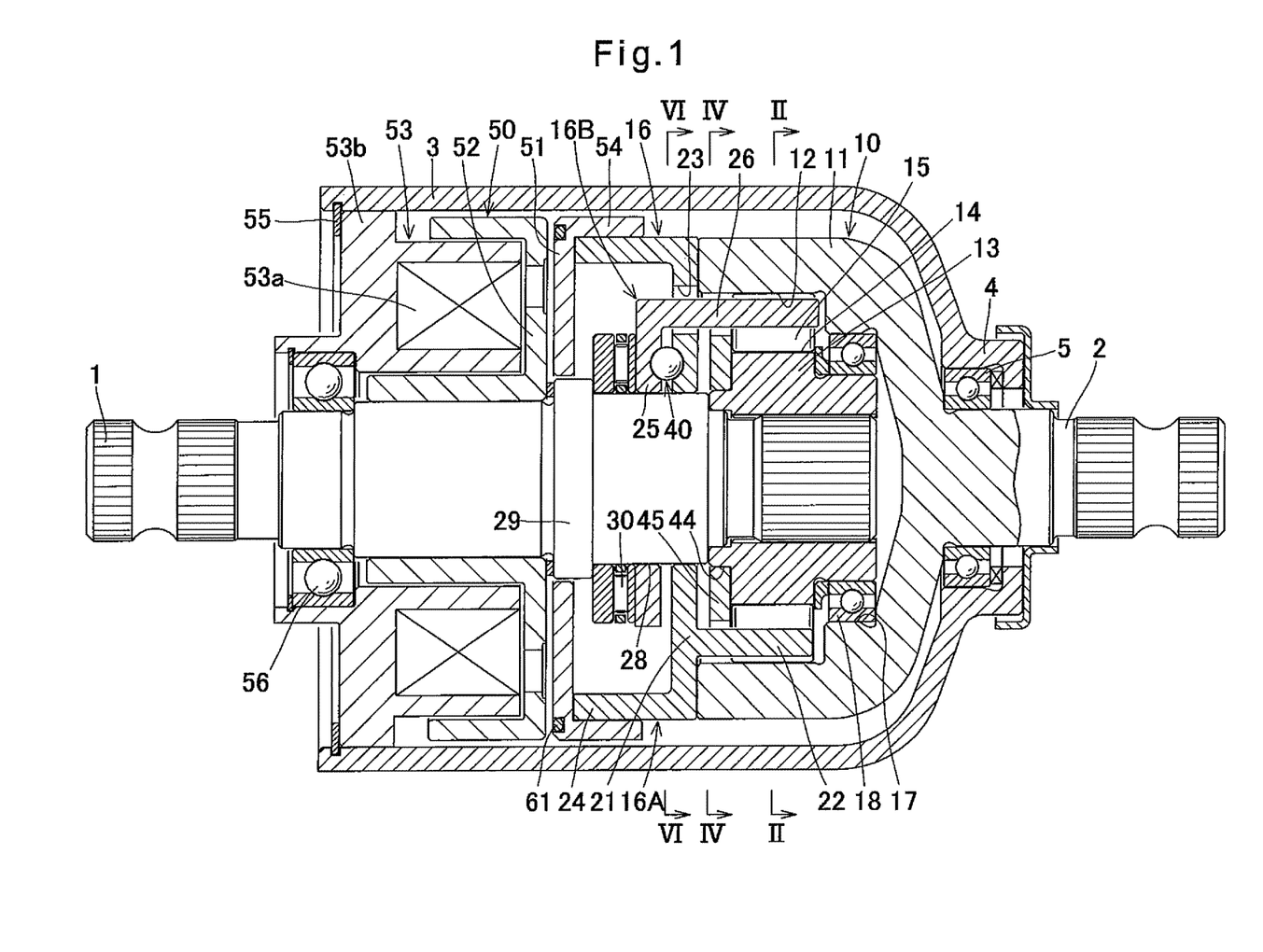
FIG. 1 is a vertical sectional view of a rotation transmission device embodying the present invention.

Now referring to the drawings, the embodiment of the present invention is described. FIG. 1 shows a rotation transmission device embodying the present invention. As shown, the rotation transmission device includes an input shaft 1, an output shaft 2 arranged coaxial with the input shaft 1, a housing 3 as a stationary member covering the ends of the input shaft 1 and the output shaft 2, and a two-way clutch 10 mounted in the housing 3 and configured to selectively transmit rotation of the input shaft 1 to the output shaft 2, and an electromagnetic clutch 50 mounted in the housing 3 and configured to selectively engage and disengage the two-way clutch 10.

The housing 3 is a cylindrical member carrying at one end thereof a small-diameter bearing tube 4. The output shaft 2 is rotatably supported by a bearing 5 mounted in the bearing tube 4.

Figure 2:
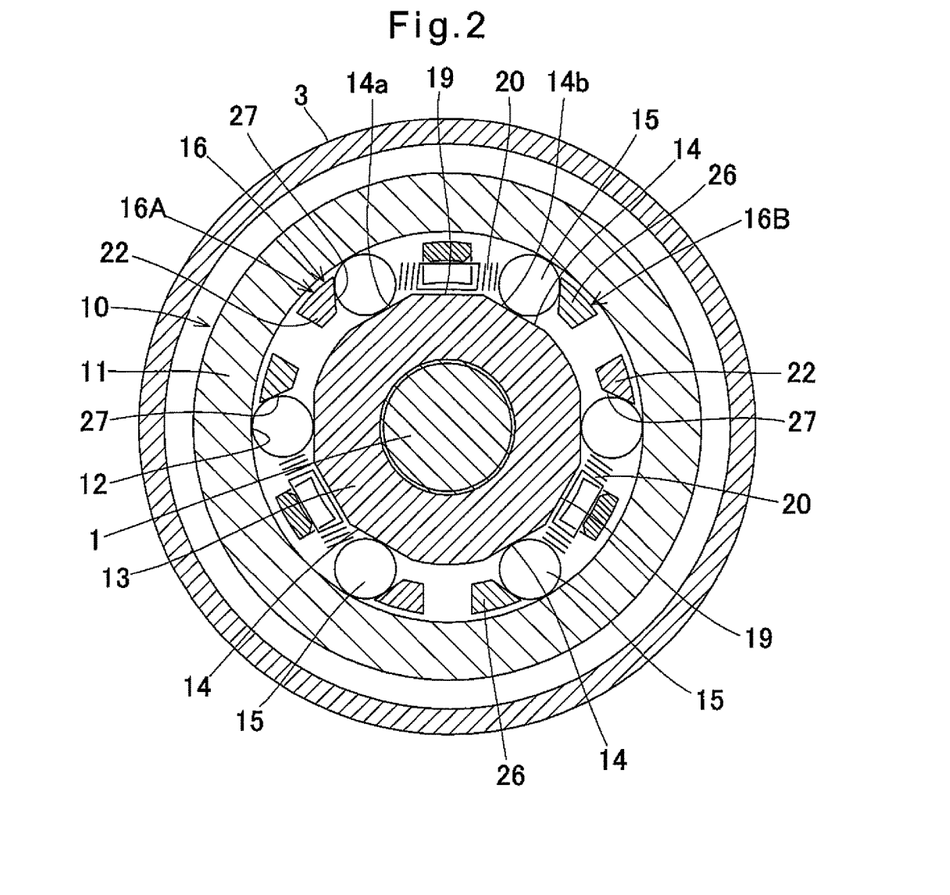
FIG. 2 is a sectional view taken along line II-II of FIG. 1.

As shown in FIGS. 1 and 2, the two-way clutch 10 includes an outer ring 11 provided at the end of the output shaft 2 and formed, on the inner periphery thereof, with a cylindrical surface 12, and an inner ring 13 provided at the end of the input shaft 1 and formed, on the outer periphery thereof, with a plurality of equidistantly spaced apart cam surfaces 14. A pair of rollers 15 as engaging elements and an elastic member 20 are disposed between each cam surface 14 and the cylindrical surface 12. The rollers 15 are retained by a retainer 16 such that when the inner ring 13 rotates in one direction, one of each pair of rollers 15 engages the cylindrical surface 12 and the cam surface 14, thereby transmitting the rotation of the inner ring 13 to the outer ring 11, and when the inner ring 13 rotates in the other direction, the other of each pair of rollers 15 engages the cylindrical surface 12 and the cam surface 14, thereby transmitting the rotation of the inner ring 13 to the outer ring 11.

The outer ring 11 has a closed end having an inner side surface formed with a small-diameter recess 17. A bearing 18 is mounted in the recess 17 and rotatably supports the end of the inner ring 13.

The inner ring 13 is rotationally fixed to the end of the input shaft 1 by means of serration fitting, but the former may be formed integral with the latter. Each of the cam surfaces 14, formed on the outer periphery of the inner ring 13, includes a pair of inclined surface portions 14a and 14b that are inclined in opposite directions to each other, such that each surface portion 14a, 14b and the cylindrical surface 12 of the outer ring 11 define a wedge-shaped space, i.e. a space narrowing toward the respective circumferential ends thereof. Between the pair of inclined surface portions 14a and 14b, a flat spring support surface 19 is formed to extend in the tangential direction of the inner ring 13 and to support one of the elastic members 20.

The elastic members 20 comprise coil spring, and are each disposed between the corresponding pair of the rollers 15 to bias the pair of rollers 15 away from each other to respective stand-by positions where the rollers 15 can instantly engage the cylindrical surface 12 and the cam surface 14.

Figure 6:
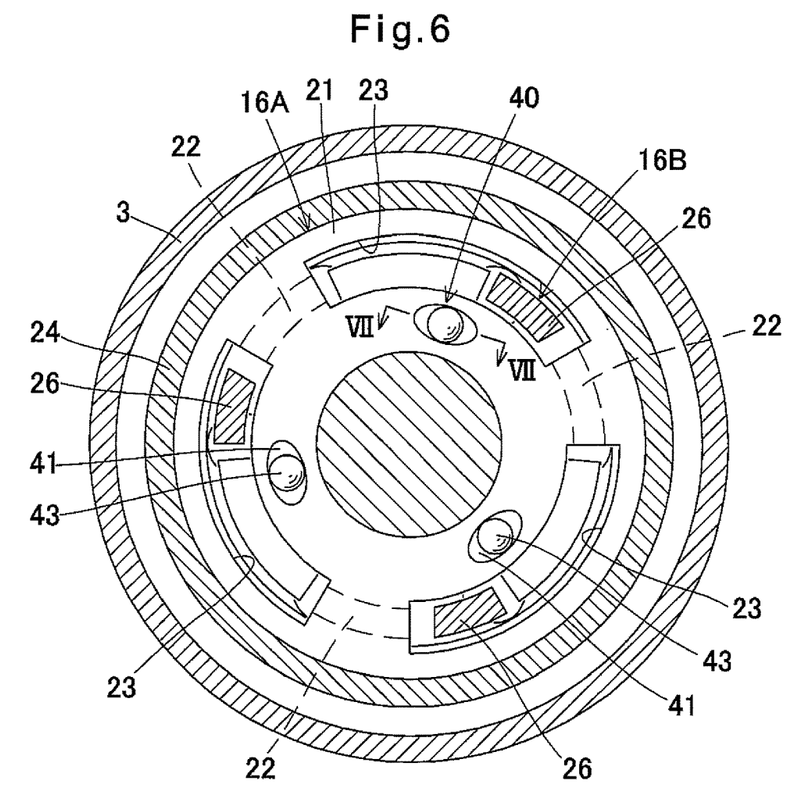
FIG. 6 is a sectional view taken along line VI-VI of FIG. 1.

The retainer 16 comprises a control retainer member 16A and a rotary retainer member 16B. As shown in FIGS. 1 and 6, the control retainer member 16A includes an annular flange 21, and bars 22 which are equal in number to the cam surfaces 14 and provided on one side of the flange 21 at its outer peripheral portion so as to be circumferentially equidistantly spaced apart from each other such that circular arc-shaped elongated holes 23 are defined between the respective adjacent pairs of the bars 22. The control retainer member 16A further includes a tubular portion 24 extending from the outer periphery of the annular flange 21 in the direction opposite to the direction in which the bars 22 extend.

The rotary retainer member 16B includes an annular flange 25, and bars 26 which are equal in number to the cam surfaces 14 and are provided on the outer periphery of the annular flange 25 so as to be circumferentially equidistantly spaced apart from each other.

The control retainer member 16A and the rotary retainer member 16B are mounted in position such that the bars 26 of the rotary retainer member 16B are inserted through the respective elongated holes 23 of the control retainer member 16A, while circumferentially alternating with the bars 22 of the control retainer member 16A, with the distal ends of the bars 22 and 26 disposed between the outer ring 11 and the inner ring 13, and with the flange 21 of the control retainer member 16A and the flange 25 of the rotary retainer member 16B both located outside of the outer ring 11.

With the retainer members 16A and 16B mounted in this manner, as shown in FIG. 2, pockets 27 are defined between the respective adjacent pairs of the bars 22 of the control retainer member 16A and the bars 26 of the rotary retainer members 16B so as to radially face the respective cam surfaces 14 of the inner ring 13. An opposed pair of the rollers 15 as the engaging elements and one of the elastic members 20 are mounted in each pocket 27.

As shown in FIG. 1, the flange 21 of the control retainer member 16A is supported so as to be slidable along a slide guide surface 28 formed on the outer periphery of the input shaft 1.

A flange portion 29 is provided at the end of the slide guide surface 28 on the side of the electromagnetic clutch 50. A thrust bearing 30 is mounted between the flange portion 29 and the flange 25 of the rotary retainer member 16B to prevent the rotary retainer member 16B from moving toward the electromagnetic clutch 50 while rotatably supporting the rotary retainer member 16B.

As shown in FIG. 1, between the flange 21 of the control retainer member 16A and the flange 25 of the rotary retainer member 16B, a torque cam 40 is provided which acts as a motion converter mechanism configured to converts the axial movement of the control retainer member 16A to the relative rotation between the control retainer member 16A and the rotary retainer member 16B.

Figure 7:
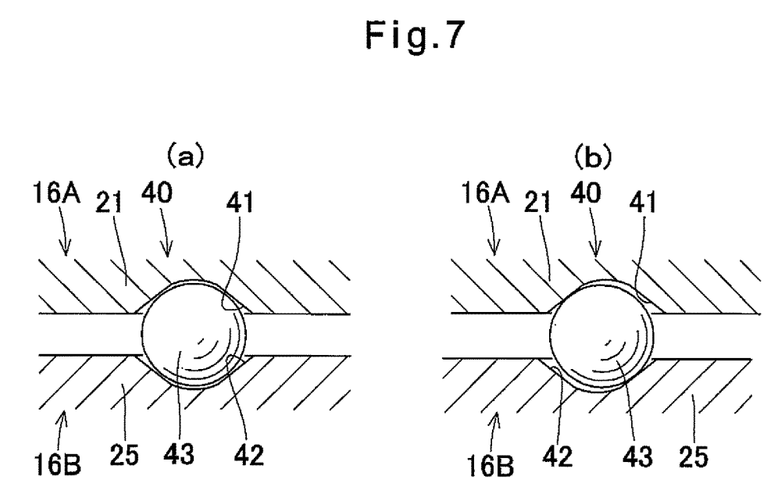
FIG. 7(a) is a sectional view taken along line VII-VII of FIG. 6.
FIG. 7(b) is a similar sectional view showing an operational state.

As shown in FIGS. 7(a) and 7(b), the torque cam 40 includes cam grooves 41 and 42 formed in the respective opposed surfaces of the flange 21 of the control retainer member 16A and the flange 25 of the rotary retainer member 16B such that the cam grooves 41 are opposed to the respective cam grooves 42. Each of the cam grooves 41 and 41 is the deepest at its circumferential center and gradually shallows toward the respective circumferential ends. The torque cam 40 further includes balls 43 each disposed between one circumferential end portion of one of an opposed pair of the cam grooves 41 and 42 and the opposite circumferential end portion of the other of the opposed pair.

The cam grooves 41 and 42 are circular, arc-shaped grooves, but the cam grooves according to the present invention may be V-grooves.

The torque cam 40 is configured such that when the control retainer member 16A is moved in one of the opposite axial directions in which the flange 21 of the control retainer member 16A approaches the flange 25 of the rotary retainer member 16B, the balls 43 move, while rolling, toward the deepest portions of the respective cam grooves 41 and 42, thereby causing the control retainer member 16A and the rotary retainer member 16B to rotate relative to each other in the direction in which the circumferential widths of the pockets 27 decrease.

As shown in FIG. 1, the inner ring 13 has, at its end on the side of the slide guide surface 28, a holder fitting surface 44 substantially equal in diameter to the slide guide surface 28. An annular spring holder 45 is fitted on the holder fitting surface 44 to prevent axial separation of the rollers 1.5 and the elastic members 20.

Figure 4:
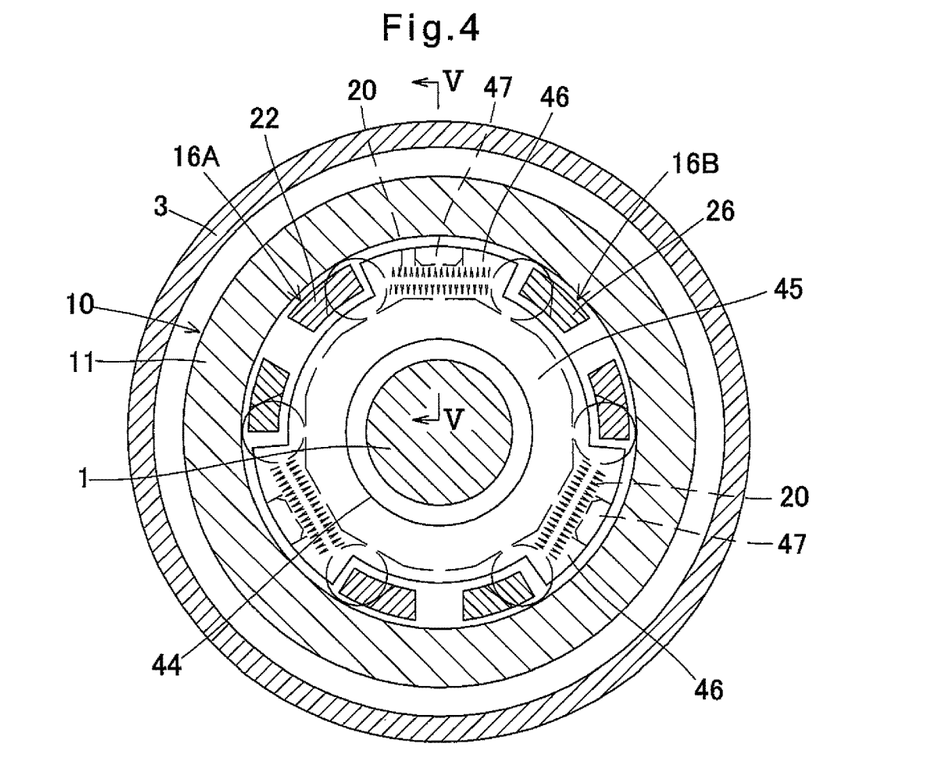
FIG. 4 is a sectional view taken along line IV-IV of FIG. 1.
Figure 5:
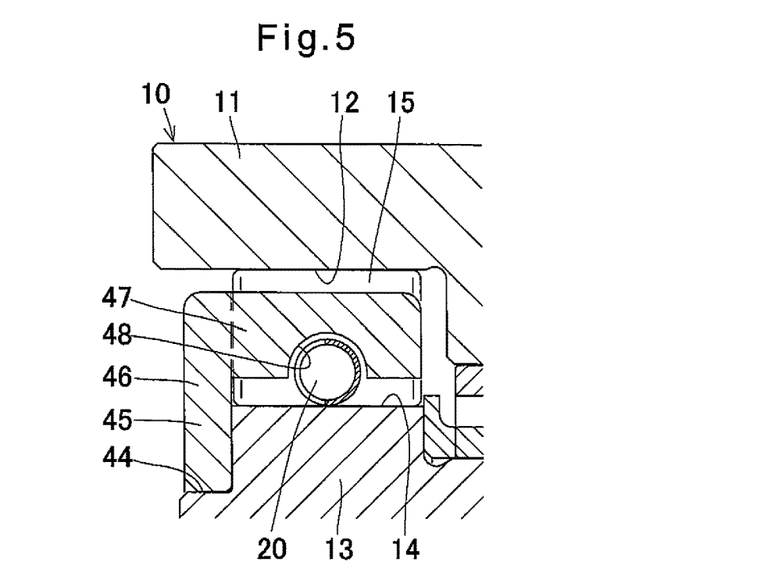
FIG. 5 is a sectional view taken along line V-V of FIG. 4.

The spring holder 45 is axially positioned by being in abutment with an axial end surface of the inner ring 13. As shown in FIGS. 4 and 5, the spring holder 45 is formed, on the outer periphery thereof, with a plurality of braking pieces 46 disposed between the respective adjacent pairs of the bars 22 of the control retainer member 16A and the bars 26 of the rotary retainer member 16B.

The braking pieces 46 are arranged such that when the control retainer member 16A and the rotary retainer member 16B rotate relative to each other in the direction in which the circumferential widths of the pockets 27 decrease, the braking pieces 46 support, at their respective side edges, the bars 22 of the control retainer member 16A and the bars 26 of the rotary retainer member 16B, thereby keeping the opposed pairs of rollers 15 in their neutral, disengaged position.

Each braking piece 46 is formed, at its outer peripheral portion, with a spring retaining piece 47 extending in the axial direction, radially outward of the elastic member 20. The elastic member 20 is fitted at its outer peripheral portion in a cutout 48 formed in the radially inner surface of the braking piece 46, so that the elastic member 20 is prevented from moving in the axial direction of the rollers 15, and thus prevented from getting out of the space between the opposed pair of rollers 15.

As shown in FIG. 1, the electromagnetic clutch 50 includes an armature 51 axially facing the end surface of the tubular portion 24 of the control retainer member 16A, a rotor 52 axially facing the armature 51, and an electromagnet 53 axially facing the rotor 52.

The armature 51 is rotatably and slidably supported by the flange portion 29 of the input shaft 1, and includes at its outer peripheral portion a coupling tube 54. The tubular portion 24 of the control retainer member 16A is press-fitted in the radially inner surface of the coupling tube 54, whereby the control retainer member 16A and the armature 51 are fixedly coupled together. Due to this coupling, the armature 51 is slidably supported at two axially spaced portions, which are the outer periphery of the flange portion 29 and the slide guide surface 28 formed on the outer periphery of the input shaft 1.

The rotor 52 is axially positioned by being fitted on the input shaft 1, while being rotationally fixed to the input shaft 1.

The electromagnet 53 includes an electromagnetic coil 53a, and a core 53b supporting the electromagnetic coil 53a. The core 53b is fitted in the opening of the housing 3, which is a stationary member, at the other end thereof, and prevented from separation therefrom by a snap ring 55 mounted to the housing in its opening at the other end. A bearing 56 is fitted on the input shaft 1, keeping the core 53b rotatable relative to the input shaft 1.

Figure 8:
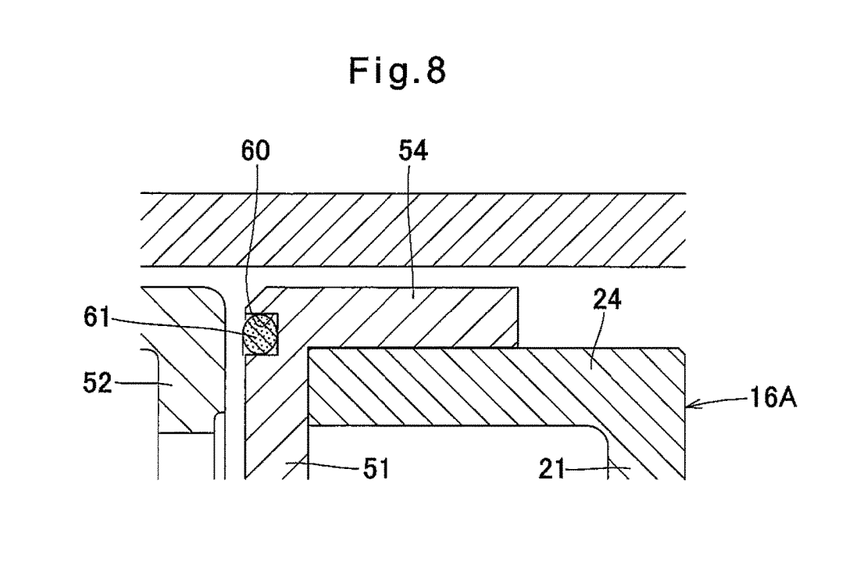
FIG. 8 is an enlarged sectional view of a portion of an armature where a shock absorbing member is mounted.

As shown in FIG. 8, an annular groove 60 is formed in the surface of the armature 51 facing the rotor 52 at its outer peripheral portion, and a shock absorbing member 61 is fitted in the annular groove 60. The shock absorbing member 61 comprises an elastic ring made of rubber or synthetic resin. The shock absorbing member 61 protrudes from the surface of the armature 51 facing the rotor 52, and is prevented from being pulled out of the armature.

Figure 3:
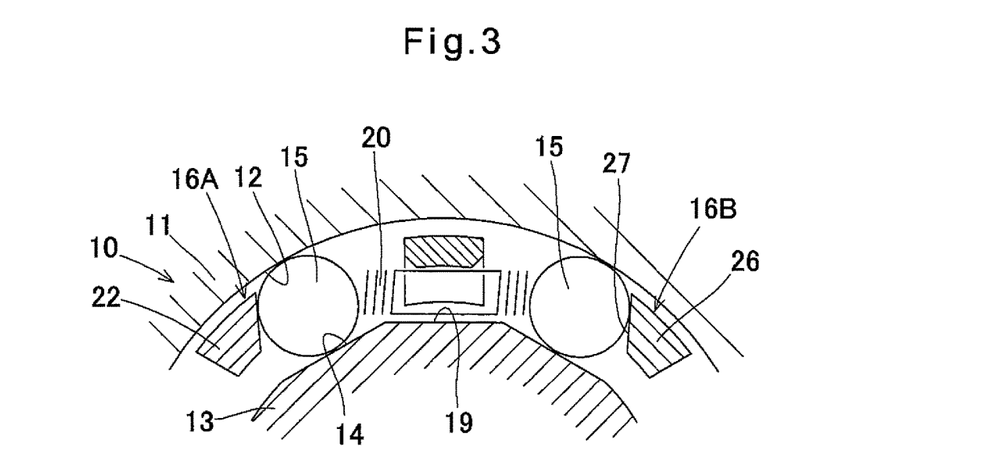
FIG. 3 is an enlarged sectional view of a portion of FIG. 2.

FIG. 1 shows the rotation transmission device of the embodiment while the electromagnetic coil 53a of the electromagnet 53 is not energized, and thus the armature 51 is spaced apart from the rotor 52. In this state, as shown in FIG. 3, the respective opposed pairs of rollers 15 of the two-way clutch 10 are in the stand-by position where they can instantly engage the cylindrical surface 12 of the outer ring 11 and the cam surfaces 14 of the inner ring 13.

With the two-way clutch 10 in the stand-by position, when the electromagnetic coil 53a is energized, a magnetic attraction force acts on the armature 51, so that the armature 51 is axially pulled toward and attracted to the rotor 52.

Since the armature 51 is fixedly coupled to the control retainer member 16A, when the armature is moved in the axial direction, the control retainer member 16A is moved in the direction in which the flange 21 of the control retainer member 16A approaches the flange 25 of the rotary retainer member 16B.

At this time, the balls 43, shown in FIG. 7(b), are moved, while rolling, toward the deepest portions of the respective cam grooves 41 and 42 as shown in FIG. 7(a). As a result, the control retainer member 16A and the rotary retainer member 16B rotate relative to each other in the direction in which the circumferential widths of the pockets 27 decrease, while the respective opposed pairs of rollers 15 are pushed by the bars 22 of the control retainer member 16A and the bars 26 of the rotary retainer member 16B, and moved toward each other. The rollers 15 are thus disengaged from the cylindrical surface 12 and the cam surfaces 14 and moved into the neutral position, where the two-way clutch 10 disengages.

With the two-way clutch 10 disengaged, when torque is applied to the input shaft 1 to rotate the inner ring 13 in one direction, the braking pieces 46 formed on the spring holder 45 push either the bars 22 of the control retainer member 16A or the bars 26 of the rotary retainer member 16B, thus rotating the control retainer member 16A and the rotary retainer member 16B together with the inner ring 13. In this state, since the respective opposed pairs of rollers 15 are kept in the disengaged, neutral position, the rotation of the inner ring 13 is not transmitted to the outer ring 11, so that the inner ring 13 rotates freely.

When, in this state, the control retainer member 16A and the rotary retainer member 16B rotate relative to each in the direction in which the circumferential widths of the pockets 27 decrease, the bars 22 of the control retainer member 16A and the bars 26 of the rotary retainer member 16B abut the respective side edges of the braking pieces 46 of the spring holder 45, thereby preventing any further relative rotation.

This prevents the elastic members 20 from being unnecessary compressed, and thus prevents breakage of any elastic member 20 due to fatigue even after the elastic members 20 are repeatedly expanded and compressed.

With the inner ring 13 rotating freely, when the electromagnetic coil 53a is de-energized, attraction force applied to the armature 51 disappears, so that the armature 51 becomes rotatable. This allows the control retainer member 16A and the rotary retainer member 16B to rotate relative to each other in the direction in which the circumferential widths of the pockets 27 increase, under the biasing force of the elastic members 20. This in turn causes the respective opposed pairs of rollers 15 to be moved into stand-by positions where the rollers 15 can instantly engage the cylindrical surface 12 and the cam surfaces 14 as shown in FIG. 2. Torque is therefore transmitted between the inner ring 13 and the outer ring 11 through one of each opposed pair of rollers 15.

When, in this state, the input shaft 1 is stopped and then rotated in the opposite direction, the rotation of the inner ring 13 is transmitted to the outer ring 11 through the other of each opposed pair of rollers 15.

In this arrangement, since the control retainer member 16A and the rotary retainer member 16B are rotated relative to each other in the direction in which the circumferential widths of the pockets 27 increase, by de-energizing the electromagnetic coil 53a, thereby moving the respective opposed pairs of rollers 15 into the stand-by positions where the rollers 15 can instantly engage the cylindrical surface 12 and the cam surfaces 14, there exists little play in the rotational direction. Also, since the inner ring 13 is integral with the input shaft 1, it is possible to instantly transmit the rotation of the input shaft 1 to the outer ring 11 through the inner ring 13.

Also, since torque is transmitted from the inner ring 13 to the outer ring 11 through rollers 15 which are equal in number to the number of the cam surfaces 14, large torque can be transmitted from the inner ring 13 to the outer ring 11.

When the control retainer member 16A and the rotary retainer member 16B rotate relative to each other in the direction in which the circumferential widths of the pockets 27 increase, the balls 43 move while rolling to shallow portions of the respective opposed pairs of cam grooves 41 and 42, as shown in FIG. 7(b).

When the electromagnetic coil 53a is energized and the armature 51 is attracted to the rotor 52, the armature 51 tends to collide harshly against the rotor 52. However, as shown in FIG. 8, since the shock absorbing member 61 in the form of an elastic ring is fitted in the annular groove 60 formed in the opposed surface of the armature 51 facing the rotor 52 so as partially protrude outwardly from the opposed surface, when the armature 51 is attracted to the rotor 52, the shock absorbing member 61 abuts the rotor 52 and is elastically deformed. This prevents the armature 51 from colliding harshly against the rotor 52, thus markedly reducing colliding sounds and vibrations.

In FIG. 8, the shock absorbing member 61 is an elastic ring, but is not limited thereto. FIGS. 9 to 12 show different shock absorbing members 61.

Figure 9:
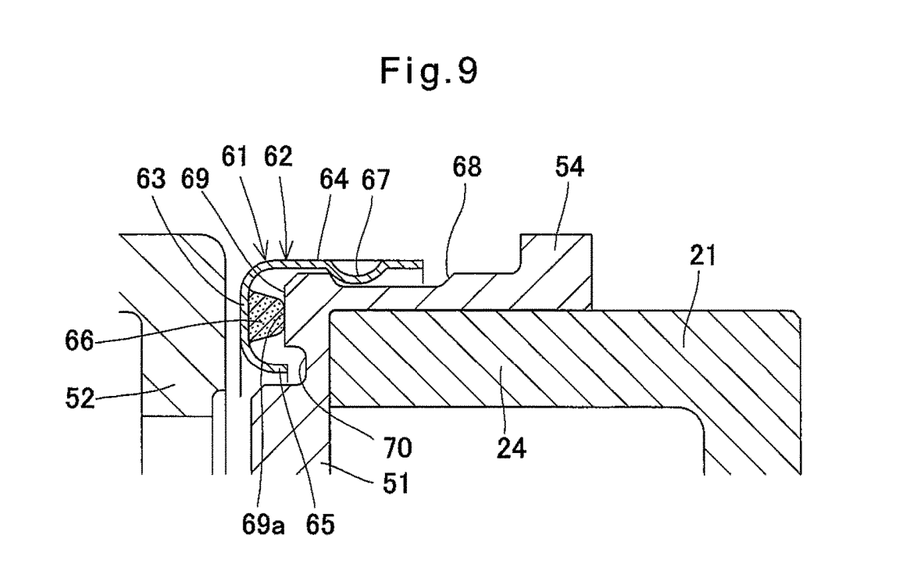
FIG. 9 is a sectional view of a different shock absorbing member.
Figure 10:
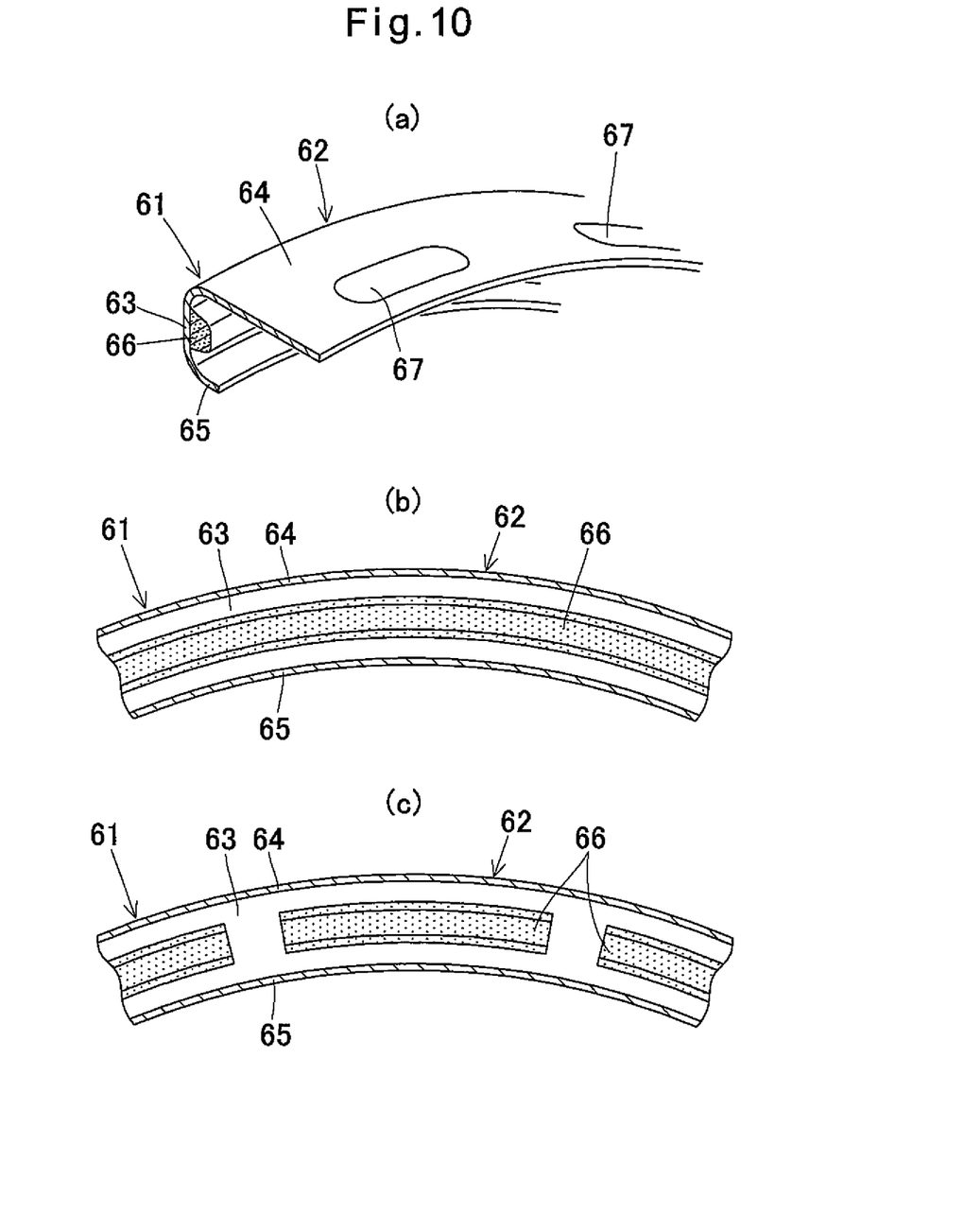
FIG. 10(a) is a partial perspective view of the shock absorbing member shown in FIG. 9.
FIG. 10(b) is a front view of FIG. 10(a)
FIG. 10(c) is a front view of a different protrusion.

The shock absorbing member 61 shown in FIGS. 9 and 10 includes a metal ring 62 comprising an annular plate portion 63, cylindrical portions 64 and 65 extending in the same direction from the outer periphery and the inner periphery of the annular plate portion 63, respectively. This shock absorbing member 61 further includes an elastic protrusion 66 provided on the inner surface of the annular plate portion 63 of the metal ring 62. A plurality of circumferentially spaced apart projections 67 are formed on the outer cylindrical portion 64, which extends from the outer periphery of the annular plate portion 63, by pressing the cylindrical portion 64 from its radially outer surface toward its radially inner surface.

The protrusion 66 is made of rubber, and is bonded to the inner surface of the annular plate portion 63 by vulcanization. As shown in FIG. 10(b), the protrusion 66 may be a circumferentially continuous annular protrusion, or as shown in FIG. 10(c), the protrusion 66 may comprise a plurality of circumferentially spaced apart, circular arc-shaped, annularly arranged protruding portions.

This shock absorbing members 61 is mounted in position such that the outer cylindrical portion 64 of the metal ring 62 is fitted on the outer periphery of the armature 51, with the projections 67 on the outer cylindrical portion 64 engaging an end wall, on the side of the rotor 52, of an annular groove 68 formed in the radially outer surface of the armature 51.

With the shock absorbing member 61 mounted in position in the above manner, the annular plate portion 63 axially faces an axial end surface 69a of an annular recess 69 formed in the outer peripheral portion of the opposed surface of the armature 51 facing the rotor 52, with the protrusion 66 supported by the axial end surface 69a. Further, the distal end of the inner cylindrical portion 65 extending from the inner periphery of the annular plate portion 63 is at the position of an annular groove 70 formed in the inner peripheral portion of the axial end surface 69a, with the outer surface of the annular plate portion 63 protruding from the opposed surface of the armature 51 facing the rotor 52.

With the shock absorbing member 61 mounted to the armature 51 in this manner, when the electromagnetic coil 53a of the electromagnet 53 is energized, and as a result, the armature 51 is attracted toward the rotor 52, the annular plate portion 63 of the metal ring 62 abuts the rotor 52, and then is pushed further, with the protrusion 66, which is made of rubber, elastically deformed. By being elastically deformed, the protrusion 66 absorbs the shock when the armature 51 is attracted to the rotor 52, thus minimizing colliding sounds and vibrations.

With the arrangement of FIG. 10(c), in which the protrusion 66 comprises a plurality of circumferentially spaced apart, circular arc-shaped, annularly arranged protruding portions, it is possible to freely adjust the elastic force of the rubber such that the shock can be most effectively absorbed.

Figure 11:
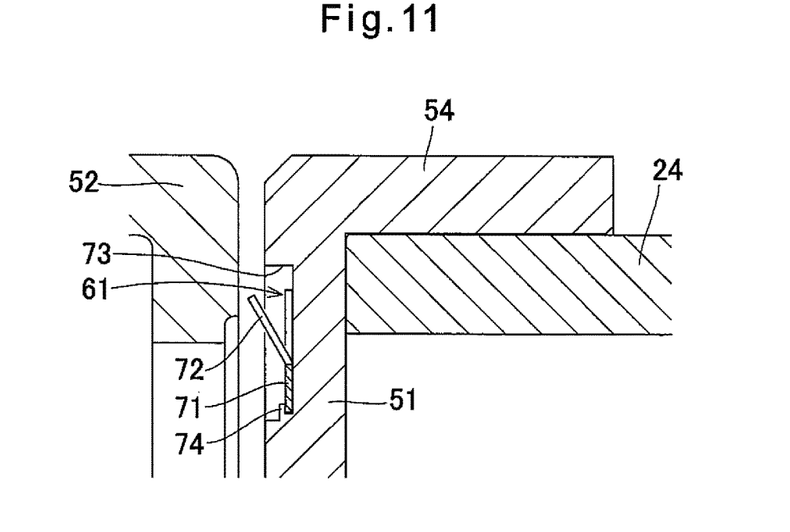
FIG. 11 is a sectional view of a further different shock absorbing member.
Figure 12:
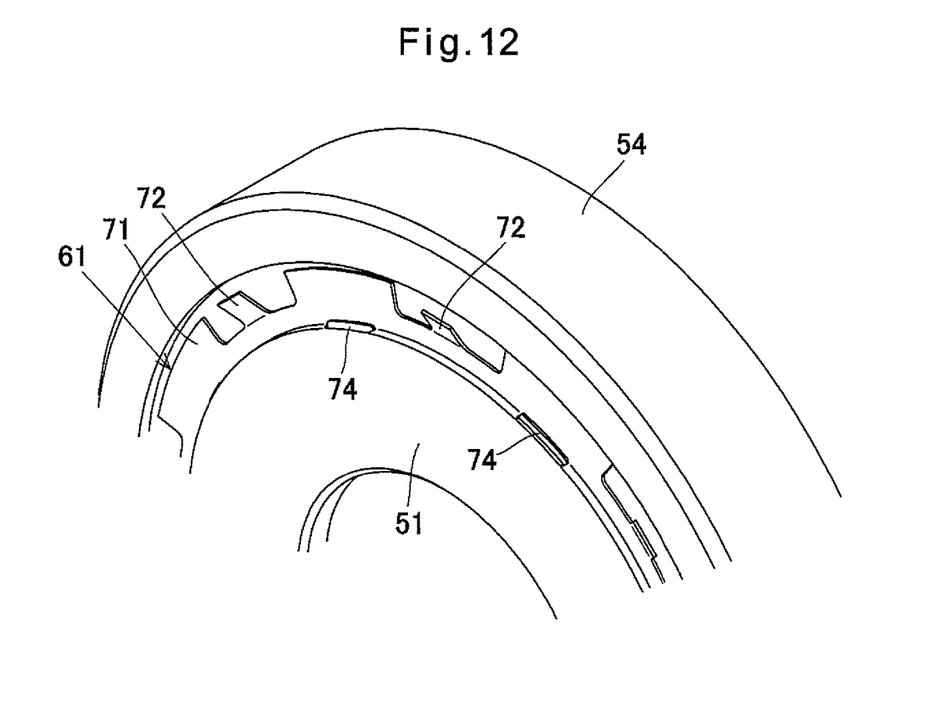
FIG. 12 is a partial perspective view of the shock absorbing member shown in FIG. 11.

The shock absorbing member 61 shown in FIGS. 11 and 12 includes an annular plate 71 formed of a meal sheet, and a plurality of elastic bent pieces 72 formed at the outer peripheral portion of the annular plate 71 so as to be circumferentially spaced apart from each other.

This shock absorbing member 61 is mounted in position such that the annular plate 71 is fitted in an annular groove 73 formed in the opposed surface of the armature 51 facing the rotor 52, with the distal ends of the bent pieces 72 protruding outwardly from the above opposed surface. In this state, the annular plate 71 is inseparably fixed in position by a plurality of caulked pieces 74 provided along the edge of the opening of the annular groove 73 and caulked toward the opening. In the alternative, the annular plate 71 may be inseparably fixed in position by adhesively bonding the annular plate 71 to the axial end surface of the annular groove 73.

With the shock absorbing member 61 of FIG. 11 mounted in position, when the electromagnetic coil 53a of the electromagnet 53 is energized, and the armature 51 is attracted toward the rotor 52, the bent pieces 72 are brought into abutment with the rotor 52 and elastically deformed. By elastically deforming, the bent pieces 72 absorb shocks when the armature 51 is attracted to the rotor 52.

While in each of the examples shown in FIGS. 8 to 12, the shock absorbing member 61 is mounted to the armature 51, the shock absorbing member 61 may be mounted on the opposed surface of the rotor 52 facing the armature 51.

In the embodiment shown in FIGS. 1 and 2, the two-way clutch 10 is of the roller type, which is configured such that when the electromagnet 53 is energized, the control retainer member 16A is moved in the axial direction, and simultaneously, the control retainer member 16A and the rotary retainer member 16B are rotated relative to each other such that the rollers 15 as the engaging elements engage the inner periphery of the outer ring 11 and the outer periphery of the inner ring 13. However, the two-way clutch 10 is not limited thereto.

Figure 13:
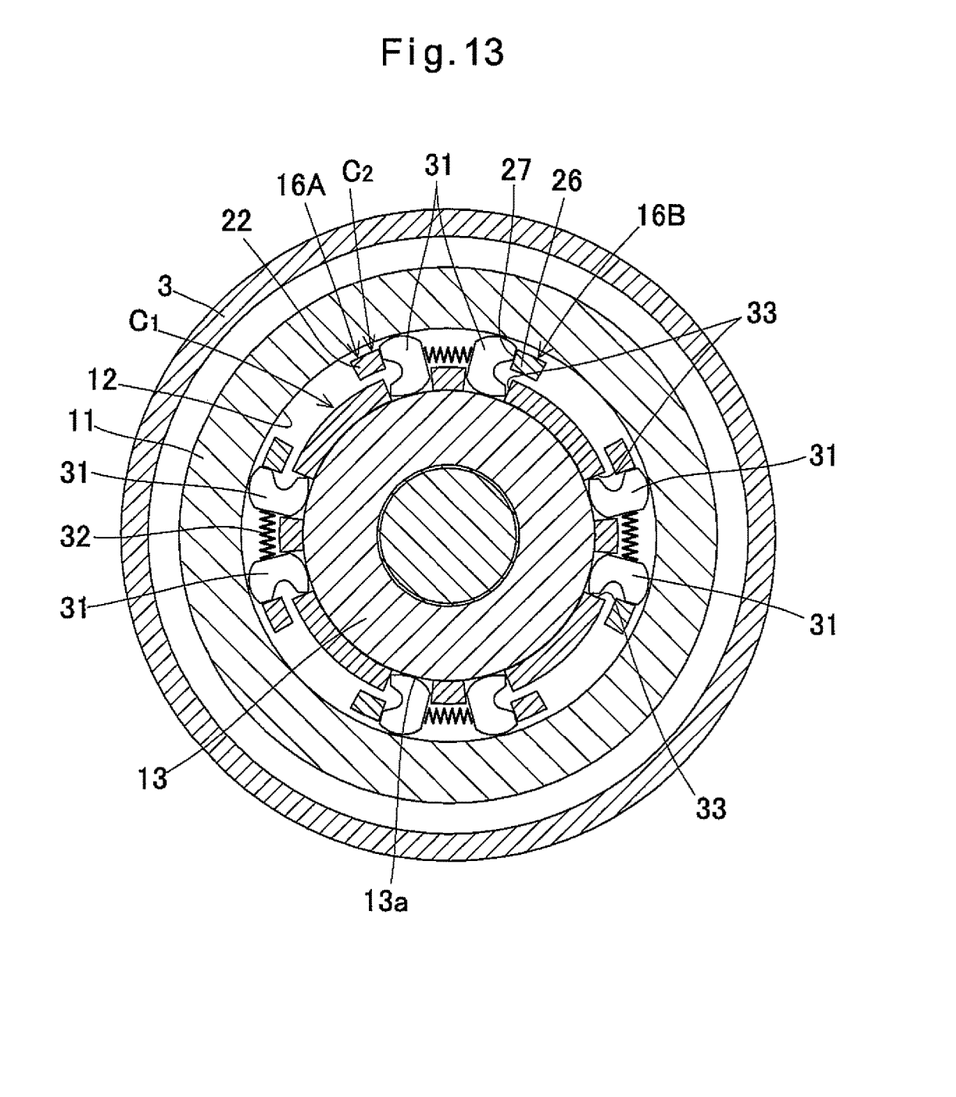
FIG. 13 is a sectional view of a different two-way clutch.

For example, as shown in FIG. 13, the two-way clutch 10 may be a sprag type clutch including a pair of retainers $C_1$ and $C_2$ having different diameters from each other and arranged one inside the other. The large-diameter, outer retainer $C_2$ comprises the control retainer member 16A and the rotary retainer member 16B used in the embodiment shown in FIGS. 1 to 3. This two-way clutch 10 further includes pairs of sprags 31 as the engaging elements, each pair being received in one of the pockets 27 defined between the bars 22 of the control retainer member 16A and the bars 26 of the rotary retainer member 16B, and elastic members 32 each mounted in one of the pockets 27 between the pair of sprags 31. The sprags 31 have their radially inner ends inserted in pockets 33 formed in the small-diameter retainer $C_1$ so as to be pivotable about the respective radially inner ends.

This sprag type two-way clutch 10 is configured such that when the electromagnet 53 of the electromagnetic clutch 50 is de-energized, each pair of sprags 31 are pivoted under the biasing force of the elastic member 32 in the directions in which the radially outer ends thereof move away from each other, whereby the sprags 31 engage an inner cylindrical surface 12 of the outer ring 11 and an outer cylindrical surface 13a of the inner ring 13. This two-way clutch 10 is further configured such that when the electromagnet 53 is energized, and the control retainer member 16A is moved in the axial direction, while at the same time, the control retainer member 16A and the rotary retainer member 16B rotate relative to each other, each pair of sprags 31 are pushed at their radially outer ends by the bars 22 and 26 of the respective retainer members, and pivoted in the directions in which the radially outer ends move toward each other, whereby the sprags 31 disengage from the inner cylindrical surface 12 of the outer ring 11 and the outer cylindrical surface 13a of the inner ring 13.

DESCRIPTION OF THE REFERENCES

1. Input shaft
2. Output shaft
10. Two-way clutch
11. Outer ring
13. Inner ring

15. Roller (engaging element)
16A. Control retainer member
16B. Rotary retainer member
22. Bar
26. Bar
27. Pocket
31. Sprag (engaging element)
32. Elastic member
40. Torque cam (Motion converter mechanism)
50. Electromagnetic clutch
51. Armature
52. Rotor
53. Electromagnet
60. Annular groove
61. Shock absorbing member
62. Metal ring
63. Annular plate portion
64. Cylindrical portion
66. Protrusion
67. Projection
68. Annular groove
69. Annular recess
69a. Axial end surface
70. Annular groove
71. Annular plate
72. Bent piece
73. Annular groove
74. Caulked piece

What is claimed is:

1. A rotation transmission device comprising an input shaft, an output shaft positioned coaxially with the input shaft, a two-way clutch configured to selectively transmit rotation between the input shaft and the output shaft, and an electromagnetic clutch configured to selectively engage and disengage the two-way clutch,
    wherein the two-way clutch comprises an outer ring positioned at an end of the output shaft and having an inner periphery, an inner ring positioned at an end of the input shaft and having an outer periphery, a control retainer including first bars, a rotary retainer including second bars, wherein the first bars and the second bars are received between the inner periphery of the outer ring and the outer periphery of the inner ring, and positioned such that the first bars alternate with the second bars in a circumferential direction, with pockets defined between respective adjacent pairs of first and second bars, a plurality of pairs of engaging elements, each pair of the engaging elements being received in one of the pockets so as to be engageable with the inner periphery of the outer ring and the outer periphery of the inner ring, and elastic member, each of the elastic members being received in one of the pockets and being configured to bias the pair of the engaging elements received in the one of the pockets away from each other,
    wherein the electromagnetic clutch comprises an armature coupled to the control retainer, a rotor spaced apart from, and facing, the armature in an axial direction, and an electromagnet supported by a stationary member so as to face the rotor in the axial direction, and configured to apply a magnetic attraction force to the armature such that the armature is attracted toward the rotor when the electromagnet is energized,
    wherein the rotation transmission device is configured such that when the electromagnet is energized, the control retainer is moved in the axial direction toward the rotor, together with the armature, and wherein the rotation transmission device further comprises a motion converter mechanism configured to convert the axial movement of the control retainer toward the rotor to a relative rotation between the control retainer and the rotary retainer in a direction in which circumferential widths of the pockets decrease, thereby disengaging the engaging elements,
    wherein a shock absorbing member for absorbing an impact force when the armature is attracted to the rotor is provided positioned on one of an opposed surface of the armature facing the rotor and an opposed surface of the rotor facing the armature,
    wherein the shock absorbing member comprises a metal ring comprising an annular plate portion and a cylindrical portion configured at an outer periphery of the annular plate portion, and an elastic protrusion adhesively bonded to an inner surface of the annular plate portion, wherein the shock absorbing member is mounted such that the cylindrical portion is fitted on an outer periphery of the one of the armature and the rotor on which the shock absorbing member is positioned, the annular plate portion faces an axial end surface of an annular recess defined in the one of the opposed surface of the armature facing the rotor and the opposed surface of the rotor facing the armature at an outer peripheral portion of the one of the opposed surface of the armature facing the rotor and the opposed surface of the rotor facing the armature, the elastic protrusion is supported by the axial end surface of the annular recess, and the annular plate portion has an outer surface protruding from the one of the opposed surface of the armature facing the rotor and the opposed surface of the rotor facing the armature, and
    wherein the elastic protrusion is between the annular plate portion and the axial end surface.

2. A rotation transmission device comprising an input shaft, an output shaft positioned coaxially with the input shaft, a two-way clutch configured to selectively transmit rotation between the input shaft and the output shaft, and an electromagnetic clutch configured to selectively engage and disengage the two-way clutch,
    wherein the two-way clutch comprises an outer ring positioned at an end of the output shaft and having an inner periphery, an inner ring positioned at an end of the input shaft and having an outer periphery, a control retainer including first bars, a rotary retainer including second bars, wherein the first bars and the second bars are received between the inner periphery of the outer ring and the outer periphery of the inner ring, and positioned such that the first bars alternate with the second bars in a circumferential direction, with pockets defined between respective adjacent pairs of first and second bars, a plurality of pairs of engaging elements, each pair of the engaging elements being received in one of the pockets so as to be engageable with the inner periphery of the outer ring and the outer periphery of the inner ring, and elastic members, each of the elastic members being received in one of the pockets and being configured to bias the pair of the engaging elements received in the one of the pockets away from each other,
    wherein the electromagnetic clutch comprises an armature coupled to the control retainer, a rotor spaced apart from, and facing, the armature in an axial direction, and an electromagnet supported by a stationary member so as to face the rotor in the axial direction, and configured to apply a magnetic attraction force to the armature such that the armature is attracted toward the rotor when the electromagnet is energized, wherein the rotation transmission device is configured such that when the electromagnet is energized, the control retainer is moved in the axial direction toward the rotor, together with the armature, and wherein the rotation transmission device further comprises a motion converter mechanism configured to convert the axial movement of the control retainer toward the rotor to a relative rotation between the control retainer and the rotary retainer in a direction in which circumferential widths of the pockets decrease, thereby disengaging the engaging elements, wherein a shock absorbing member for absorbing an impact force when the armature is attracted to the rotor is positioned on one of an opposed surface of the armature facing the rotor and an opposed surface of the rotor facing the armature, wherein the shock absorbing member comprises a metal ring comprising an annular plate portion and a cylindrical portion configured at an outer periphery of the annular plate portion, and an elastic protrusion adhesively bonded to an inner surface of the annular plate portion, wherein the shock absorbing member is mounted such that the cylindrical portion is fitted on an outer periphery of the one of the armature and the rotor on which the shock absorbing member is positioned, the annular plate portion faces an axial end surface of an annular recess defined in the one of the opposed surface of the armature facing the rotor and the opposed surface of the rotor facing the armature at an outer peripheral portion of the one of the opposed surface of the armature facing the rotor and the opposed surface of the rotor facing the armature, the elastic protrusion is supported by the axial end surface of the annular recess, and the annular plate portion has an outer surface protruding from the one of the opposed surface of the armature facing the rotor and the opposed surface of the rotor facing the armature, and wherein the cylindrical portion has a radially inner surface configured with a plurality of circumferentially spaced apart projections fitted in an annular groove defined in the outer periphery of the one of the armature and the rotor on which the shock absorbing member is positioned, and in engagement with an end wall of the annular groove on a side of the one of the opposed surface of the armature facing the rotor and the opposed surface of the rotor facing the armature.

3. The rotation transmission device of claim 1, wherein the elastic protrusion is a circumferentially continuous annular elastic protrusion.

4. The rotation transmission device of claim 1, wherein the elastic protrusion comprises a plurality of circumferentially spaced apart, circular arc-shaped annularly positioned elastic protruding portions.

5. The rotation transmission device of claim 2, wherein the elastic protrusion is a circumferentially continuous annular elastic protrusion.

6. The rotation transmission device of claim 2, wherein the elastic protrusion comprises a plurality of circumferentially spaced apart, circular arc-shaped, annularly positioned elastic protruding portions.

* * * * *